UNITED STATES PATENT OFFICE.

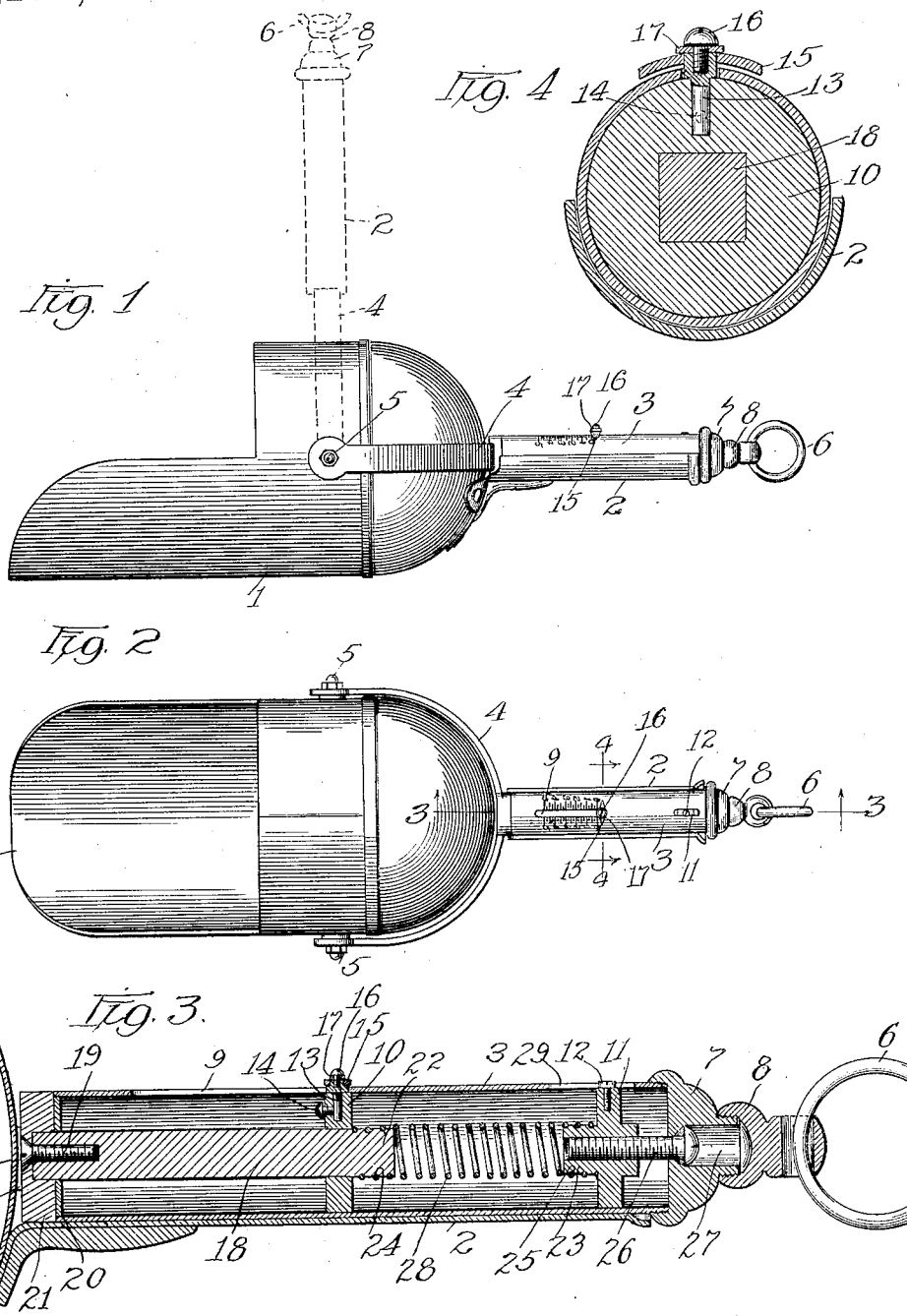

JAMES I. LEARY, OF CHICAGO, ILLINOIS.

SCOOP.

1,152,824.   Specification of Letters Patent.   Patented Sept. 7, 1915.

Application filed October 8, 1914. Serial No. 865,675.

*To all whom it may concern:*

Be it known that I, JAMES IHRIE LEARY, a citizen of the United States, residing at Chicago, in the county of Cook, State of Illinois, have invented a new and useful Scoop, of which the following is a specification.

My invention relates to improvements in scoops provided with a weighing attachment and the object of my invention is to provide a simple and effective weighing mechanism in connection with the handle of the scoop. I attain this object by the mechanism illustrated in the accompanying drawing in which—

Figure (1) represents a side view of the entire machine wherein the weighing position of the handle is indicated by dotted lines. Fig. (2) is a top view of the machine and Fig. (3) is a vertical section of the part of the machine on the plane (3) Fig. 2. Fig. (4) is the transverse section on the plane (4) Fig. 2.

Similar letters refer to similar parts through-out the several views.

(1) represents the bowl of the scoop; (5) is the rivet axis about which the semi-circular support (4) hinges. The support (4) is attached to a member (18) preferably of square cross sections. This member (18) is attached at its other end to a spring (28) which spring is supported at its other end to an adjustable support (11) which is provided with a central adjusting screw (26) which works through and in connection with the handle cap (7) in such a manner that by turning the screw (26) the support (11) may be operated back and forth to produce more or less tension on the spring (28). To prevent the support (11) from turning with the adjusting screw, this support is provided with a screw or small projection that works in the slot (29) of the handle (3). To the rod (18) is attached an enlarged piece forming a guide within the walls of the tubular handle (3), to which is attached an indicator (15) or its equivalent which works up and down in the slot (9) along which are placed the graduation marks or different weights. The adjustment screw (26) is protected by removable cap (8) which cap may be provided with a loose fitting ring (6); this thumb ring, caps (7) and (8) and tube (3) forming the weighing handle. The scoop (1) is provided with a shell handle of semi-circular cross section (2) which may be brought in such position to partly encircle the weighing handle so that the two handles may be grasped together and held in a position as shown in Fig. (1) while filling. When the scoop is filled the thumb may be passed through the ring (6) and the part (2) of the handle released and weighing handle will then be in the position as shown in dotted line of Fig. (1) and the indicator will register the weight.

Having thus described my invention, I claim—

1. A spring balance scale scoop comprising a scoop supported within the semi-circular support so as to be capable of rotation about the axis of such support and attached to a spring balance scale held within a tubular handle and provided with an adjusting screw for regulating the tension of such spring scale, a protecting cap over such adjustment screw, a loosely fitted ring attached to such protecting cap and a rigid handle attached to such scoop so as to fit back against or partly around the chamber of the weighing scale as and for the purpose described.

2. A combination of a scoop and a weighing attachment comprising a scoop (1) and the pivot (5), support (4), the spring balance device (3), the cap (7), the protecting cap (8), the ring (6) and the rigid handle (2) as and for the purpose described.

JAMES I. LEARY.

Witnesses:
ROSE LAPPEN,
AGNES T. TAFTS.

Copies of this patent may be obtained for five cents each, by addressing the "Commissioner of Patents, Washington, D. C."